United States Patent
Huh et al.

(10) Patent No.: US 7,554,536 B2
(45) Date of Patent: Jun. 30, 2009

(54) PICTURE DISPLAYING METHOD AND APPARATUS OF A PERSONAL INFORMATION TERMINAL

(75) Inventors: Shin Huh, Seoul (KR); Yong Soo Shin, Anyang-si (KR)

(73) Assignee: LG Electronics Inc., Seoul (KR)

( * ) Notice: Subject to any disclaimer, the term of this patent is extended or adjusted under 35 U.S.C. 154(b) by 386 days.

(21) Appl. No.: 10/132,174

(22) Filed: Apr. 26, 2002

(65) Prior Publication Data
US 2002/0158863 A1 Oct. 31, 2002

(30) Foreign Application Priority Data
Apr. 27, 2001 (KR) .............................. 2001-23052

(51) Int. Cl.
G09G 5/00 (2006.01)
(52) U.S. Cl. .................................. 345/211; 348/333.13
(58) Field of Classification Search ................. 345/211, 345/212, 213, 98, 204; 348/14.01, 552, 207.1, 348/333.13, 333.02, 730; 396/49, 238, 282; 713/320; 307/38
See application file for complete search history.

(56) References Cited
U.S. PATENT DOCUMENTS 5,610,678 A * 3/1997 Tsuboi et al. ............... 396/373
5,764,205 A * 6/1998 Doyle et al. ................ 345/74.1
5,995,139 A * 11/1999 Lee ............................. 348/143
6,075,949 A * 6/2000 Hatakenaka et al. ........ 396/301
6,362,851 B1 * 3/2002 Lavelle et al. .......... 348/333.01
6,493,828 B1 * 12/2002 Yamaguchi et al. ......... 713/324

FOREIGN PATENT DOCUMENTS
KR 100320161 12/2001

* cited by examiner

Primary Examiner—Abbas I Abdulselam
(74) Attorney, Agent, or Firm—KED & Associates, LLP

(57) ABSTRACT

The present invention relates to method and apparatus of displaying a picture if a personal information terminal is in power-off mode or in nonuse state when an external AC power is being supplied. The present picture displaying apparatus embedded in a personal information terminal comprises a power supplier for receiving an electric energy from an external power source; a data storage storing picture data; a data displayer for reading and displaying the stored picture data; and a controller checking whether the external power source is supplied through the power supplier if a current operation state is power-off or nonuse state, and controlling the data displayer to read and display the stored picture data, based on the checked result. Owing to the present invention, a personal information terminal presents user's favorite picture or pictures on a displaying unit when in nonuse state under the condition that an external power is supplied, whereby a user can feel sentimental emotion from a dry machine.

33 Claims, 4 Drawing Sheets

*Conventional Art*

| Flag | Software Identifier | address of a picture | | | | | display manner | display configuration |
|---|---|---|---|---|---|---|---|---|
| | | N | Start | End | Start | End | ---- | | |
| On | Alsee | 1 | CCF8 | CDFF | Null | Null | | One | Full, Light On |
| Off | Alsee | 2 | 0CA0 | 0DAF | 0DB0 | 0DCF | | Multi | Full, Light Off |
| On | Alsee | 2 | 0CA0 | 0DAF | 0DB0 | 0DCF | | Slide | Full, Light Off |
| On | SeeInternet | 1 | www... | Null | Null | Null | | One | Full, Light On |
| ⋮ | ⋮ | ⋮ | ⋮ | | | | | ⋮ | ⋮ | www.xxx.yyy/user/pictures/a1.tif

PICTURE DISPLAYING METHOD AND APPARATUS OF A PERSONAL INFORMATION TERMINAL

BACKGROUND OF THE INVENTION

1. Field of the Invention

The present invention relates to picture displaying method and apparatus of a personal information terminal such as PDA (Personal Digital Assistant), more particularly, to method and apparatus of displaying a picture if a personal information terminal is in power-off mode or in nonuse state when an external AC power is being supplied.

2. Description of the Related Art

A lately-developed PDA, which is being widely used, has a variety of functions such as private schedule management, calculator, electronic notepad, and MP3-formatted audio data player.

The small-sized PDA is easy to carry and it has a relatively wide LCD for its small size and a touch screen as an input device. A user carrying the PDA can check or confirm necessary information through the wide LCD easily and enter data or choose a desired function through the touch screen.

And, the PDA equips with a rechargeable battery which is conveniently charged through an additional AC charging cradle while the PDA is placed thereon. The rechargeable battery supplies an electric energy for the PDA while it is carried by a user.

The personal information terminal such as PDA, in general, conducts a power save operation to reduce power consumption. In conducting a power save operation, conditions such as time determining when to enter a power save mode are necessary. FIG. 1 shows an illustrative menu screen for setting power save mode entering periods. The time 101 set in the 'On Battery Power' item specifies that the system should enter a power save mode if the personal information terminal is continuously unused during the time 101 under the condition that a rechargeable battery supplies an electric energy. The time 102 set in the 'On External Power' item indicates that the system should enter a power save mode if continuously unused during the time 102 under the condition that an external power is fed.

In a power save mode, elements consuming much electric energy, e.g., an LCD backlight is turned off. The operation-suspended elements are turned on again on an input.

And, even though a user touches an On/Off button to turn off the personal information terminal, the power supply from a battery or an external AC power for internal elements is not completely cut off. Instead, the operation mode is changed to operation-suspended state, namely, power save mode. Thus, the personal information terminal can still detect in a power-off state whether there is an input, e.g., data inputs or AC power supply.

As explained above, the personal information terminal changes its operation mode to power save mode if any input is not entered for a predetermined time even under the condition that an external AC power is supplied, and returns to normal operation mode, namely, power-on state the moment any input is detected.

However, the personal information terminal with such a function of power save operation can not be used for other purpose, e.g., a picture frame.

SUMMARY OF THE INVENTION

It is an object of the present invention to provide apparatus and method of using a personal information terminal as a picture frame by presenting a picture on a wide displaying unit of a personal information terminal after reading pre-stored video data constituting the picture when an external AC power is supplied.

A method of displaying a picture on a personal information terminal in accordance with the present invention is characterized in that it comprises the steps of: monitoring whether an external power is supplied or not; reading picture data from storage means if the personal information terminal is in power-off or nonuse state under the condition that an external power is supplied; and displaying the read picture data.

A picture displaying apparatus embedded in a personal information terminal in accordance with the present invention is characterized in that it comprises: a power supplier for receiving an electric energy from an external power source; a data storage storing picture data; a data displayer for reading and displaying the stored picture data; and a controller checking whether or not the external power source is supplied through the power supplier if a current operation state is power-off or nonuse state, and controlling the data displayer to read and display the stored picture data, based on the checked result.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein:

FIG. 2 is a block diagram of a personal information terminal which a picture displaying apparatus of the present invention is embedded in;

DETAILED DESCRIPTION OF THE PREFFERRED EMBODIMENT

In order that the invention may be fully understood, a preferred embodiment thereof will now be described with reference to the accompanying drawings.

Figure 1:
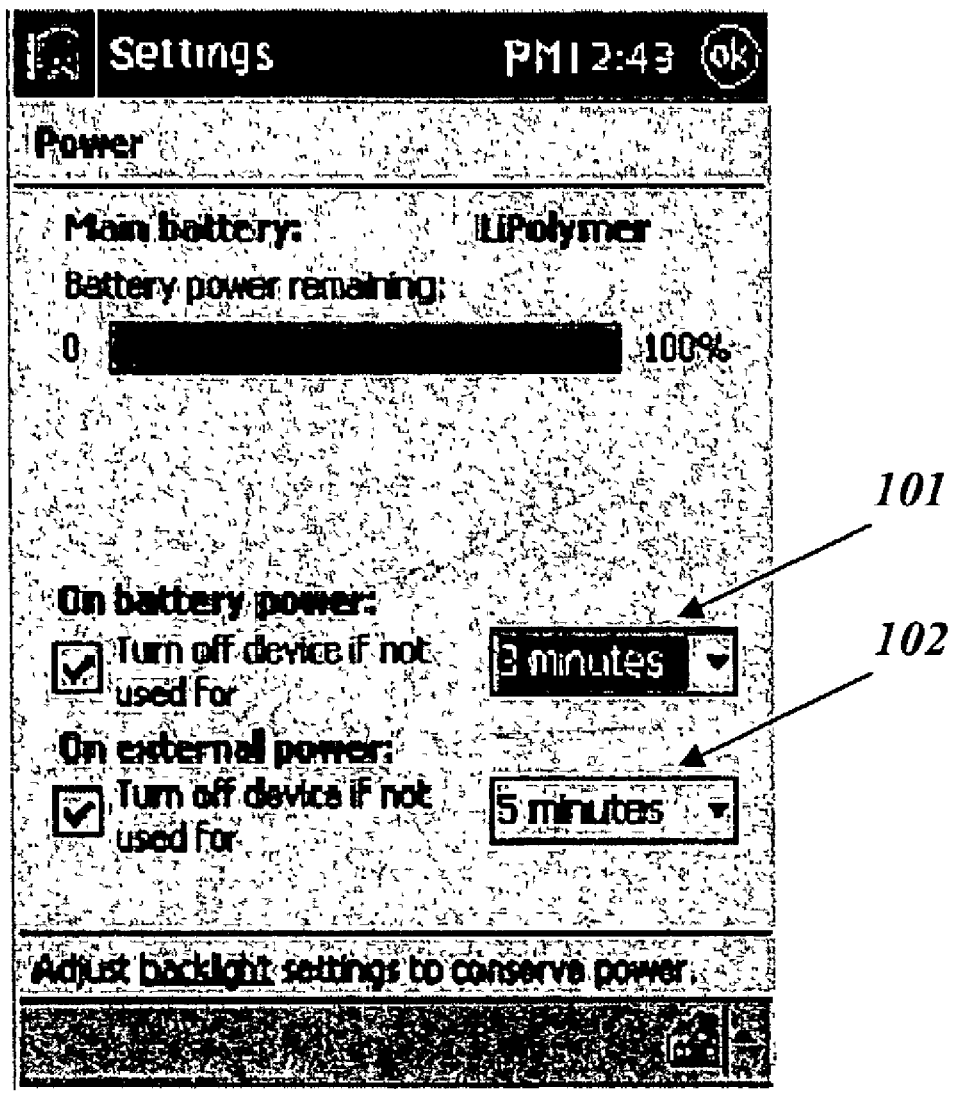
FIG. 1 shows an illustrative menu screen for setting power save mode entering periods.
Figure 2:
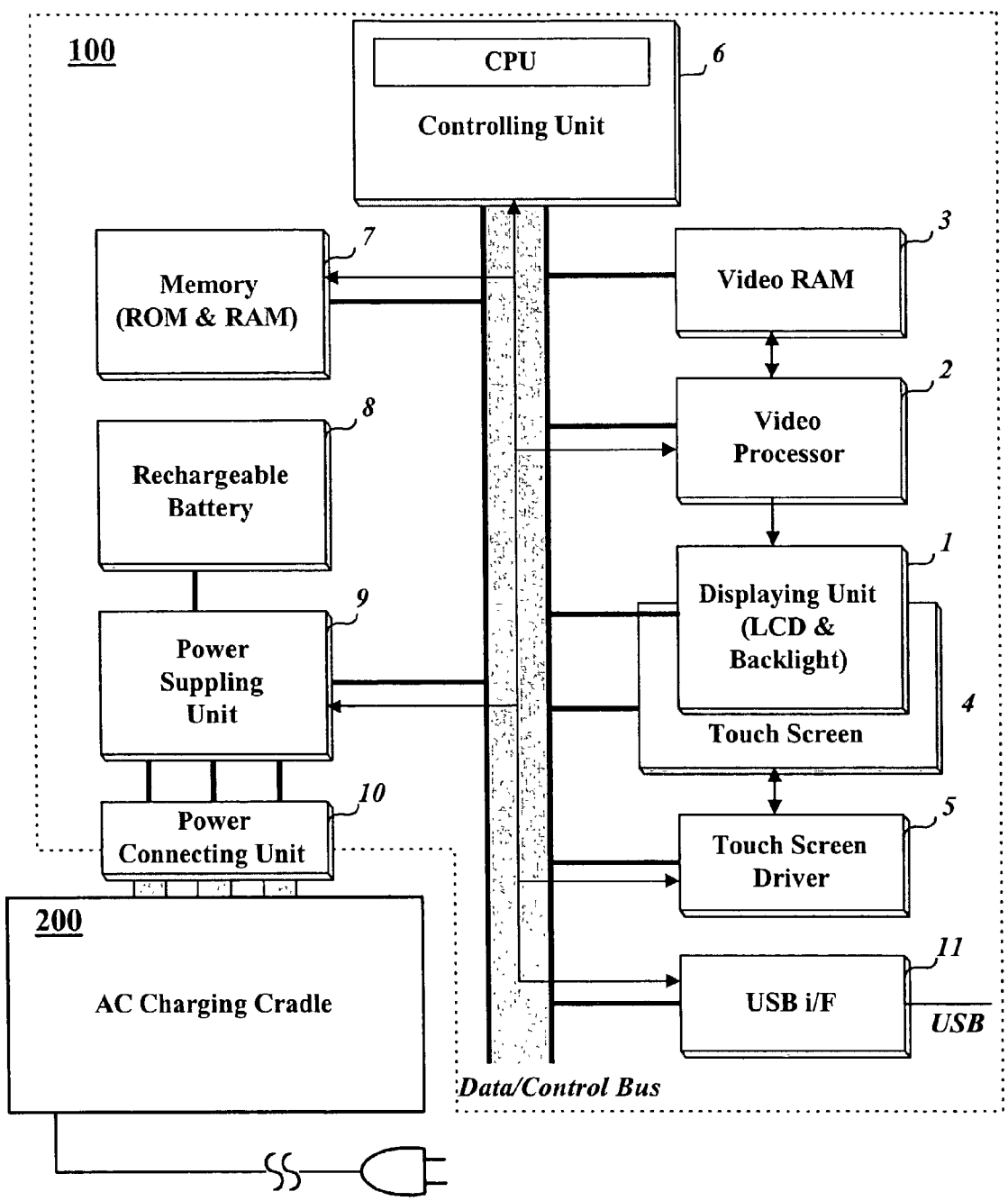

FIG. 2 is a block diagram of a personal information terminal which an apparatus conducting a picture displaying method in accordance with the present invention is embedded in. The personal information terminal 100 of FIG. 2 comprises a displaying unit 1 displaying various menu items, information, and pictures; a memory 7 storing data including video data constituting at least one picture; a video processor 2 reading and processing the stored video data to convert it to display-suitable format; a video RAM 3 storing the converted data of display-suitable format; a touch screen 4 and a touch screen driver 5 detecting user's pointing on a displaying plane and selecting of the menu items displayed on the displaying unit 1; a controlling unit 6 including a CPU supervising all elements and conducting user's commands entered through the touch screen 4, etc.; a rechargeable battery 8; a power connecting unit 10 equipping with DC power contacts connectable with DC power feeding taps of an additional AC charging cradle 200; a power supplying unit 9 supplying all or selected elements with an electric energy from the rechargeable battery 8 or from the DC power contacts of the power connecting unit 10; and a USB interface 11 conducting serial data communication with an external device such as a personal computer (PC).

When the personal information terminal 100 is placed onto the AC charging cradle 200, which transforms an external AC power to a desired DC power, it is fed with an electric energy by the AC charging cradle 200 through the power connecting unit 10. This DC power supplying state through the power connecting unit 10 is called 'external power supplying mode' in general.

Figure 3:
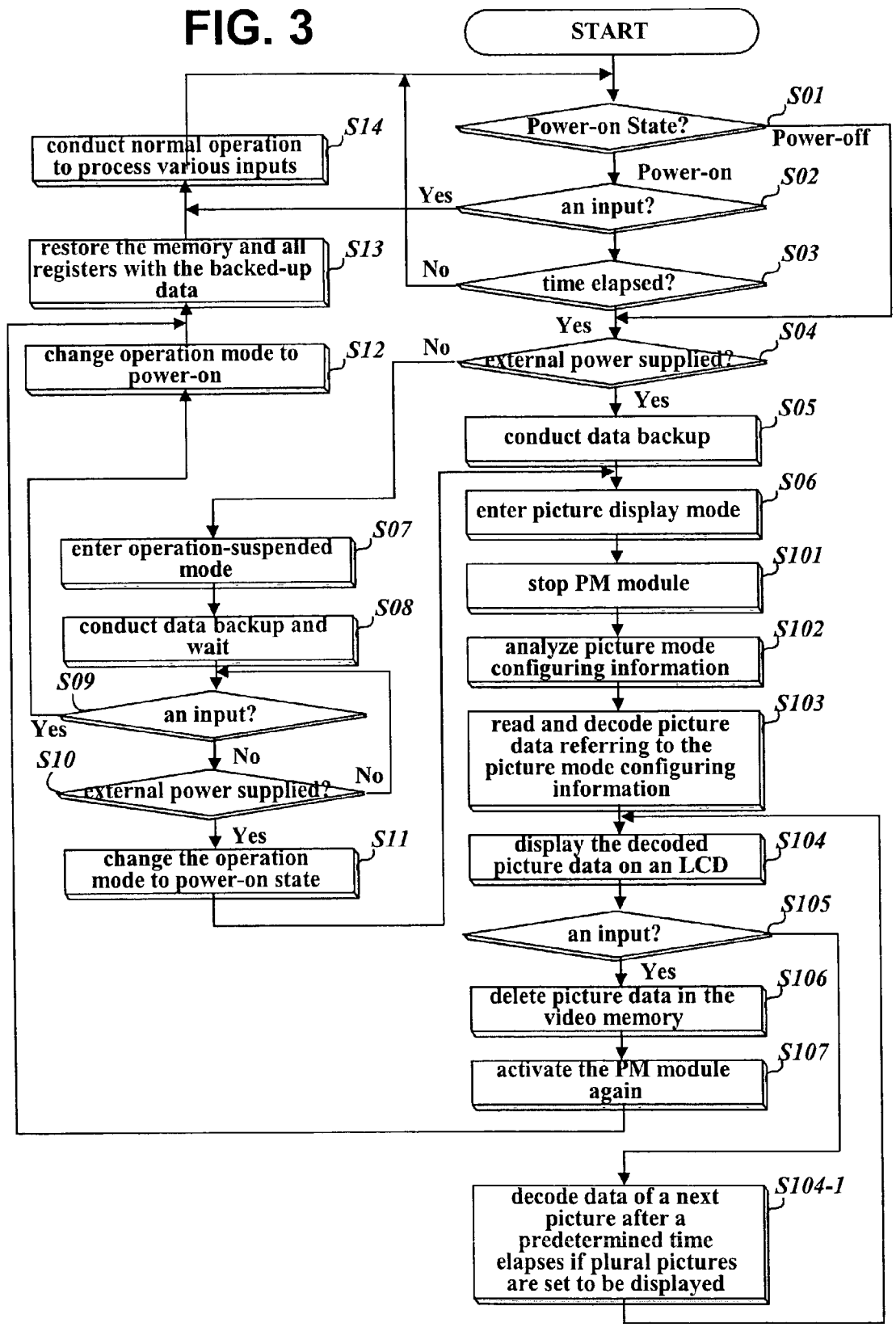
FIG. 3 is a flow chart of an embodiment of a picture displaying method conducted by a personal information terminal in accordance with the present invention.

FIG. 3 is a flow chart of an embodiment of a picture displaying method of a personal information terminal in accordance with the present invention. The procedure of FIG. 3 conducted by the personal information terminal of FIG. 2 is explained in detail below.

First, the controlling unit 6 checks whether system state is power-on or power-off mode (S01). If power-off state, the controlling unit 6 also checks whether or not an external power is being supplied (S04). If not supplied, the controlling unit 6 makes the system enter operation-suspended mode (S07) after conducting data backup for the data in the video memory 3 and in a system area of the memory 7 and values of all registers, and waits until any input is entered (S08).

In the operation-suspended mode, if any input, e.g., press of Power On/Off button or any function button, or touch on the touch screen 4 is detected (S09), the controlling unit 6 changes its operation mode to power-on (S12), and restores the memory 7 and all registers (S13) with the data backed up in the step S08. Afterwards, the controlling unit 6 conducts a suitable work to process the detected input (S14).

Even in the power-on state, the controlling unit 6 keeps checking whether there is any input (S02). If no input state continues for a predetermined time (S03), then, the controlling unit 6 checks whether an external power is being supplied (S04). If not supplied, it makes the system enter operation-suspended mode as aforementioned (S07). The predetermined time may be equal to the time set for turnover to power save mode or may be set through an additional menu screen shown in FIG. 4 for specifying non-using time 401 to initiate picture display.

If an external power is being supplied (S04) in power-off state (S01) or at the time after the predetermined time elapses (S03), the controlling unit 6 conducts data backup (SOS) and makes the system enter picture displaying mode (S06).

In addition, when an external power starts to be supplied while checking whether there is any input in power-off state (S09,S10), the controlling unit 6 also makes the system enter picture displaying mode (S06) after changing the operation mode to power-on state (S11).

Entering picture displaying mode, the controlling unit 6 deactivates PM (Power Management) module, first (S101). This is why no input during a time conditioning power save mode turnover causes the system to enter operation-suspended mode automatically if the PM module is in active. After deactivating the PM module, the controlling unit 6 analyzes picture mode configuring information stored in the memory 7 (S102). All fields of the picture mode configuring information has been set or selected by a user.

Figures 4, 5:
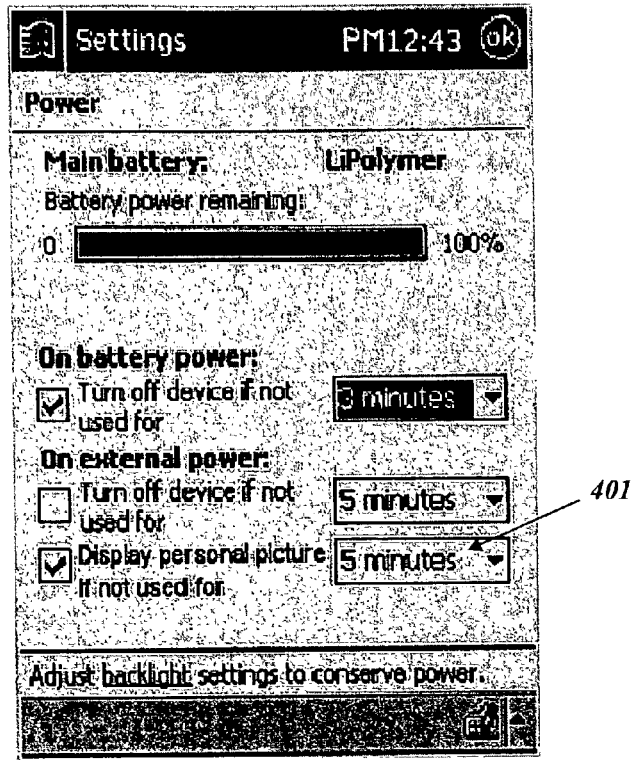
FIG. 4 shows an illustrative menu screen including a combo box for setting a picture display initiating period.
FIG. 5 shows an illustrative structure of picture mode configuring information according to the present invention.

FIG. 5 shows an illustrative structure of the picture mode configuring information. Each entry of the picture mode configuring information is composed of five fields of a flag 500 indicative of whether or not to display picture data of a corresponding entry; a software identifier 501 identifying a software to decode picture data of a corresponding entry; an address 502 pointing a location of corresponding picture data; a displaying manner 503 indicating how to display picture data; and display configuration 504 defining conditions for displaying picture data.

The picture data has been stored in the memory 7 after being receiving from outside through the USB interface 11 beforehand, otherwise, it starts to be downloaded from outside through the USB interface 11 on entrance of picture display mode and then is displayed onto the displaying unit 1. For the latter way, the software identifier field is filled in with a decoding program 'SeeInternet' capable of accessing directly source data located in a network, and the address field is filled in with URL (Universal Resource Locator) information pointing uniquely store position in a global network.

The software 'SeeInternet' can be easily programmed using disclosed and well-known data decoding and network accessing technology.

In picture displaying mode, a plurality of pictures may be displayed. In case of plural pictures, the display manner field 503 specifies a method on how to display the plural pictures. Two exemplary displaying manners are 'Multi' and 'Slide' way. In the 'Multi' way, all pictures are displayed simultaneously in divided sub-windows of a full screen, and in the 'Slide' way, all pictures are sequentially displayed in a full screen at regular intervals. Besides the 'Multi' and 'Slide' way, there may be various different displaying ways.

In addition, hardware (H/W) setting information including screen condition for displaying pictures is written in the display configuration field 504. For example, information indicative of whether to turn on or off a backlight of the displaying unit 1 is written in the field 504. Moreover, information about how to set other H/W not used for displaying pictures may be written in the field 504, too.

In the analyzing process of the picture mode configuring information, the controlling unit 6 checks what entries are set to be displayed based on their respective flags 500 which are selectively set in advance by a user. If a single entry is set to be displayed, the controlling unit 6 loads a software specified by the software identifier of the entry into the memory 7 and executes it while delivering the number of pictures to be displayed and each start and end address of the pictures to the identified software. Then, the executed software reads picture data from an area addressed by the received address and decodes it (S103). The decoded data is then stored in the video memory 3 of which data is presented onto the displaying unit 1 (S104). At this time, the executed software writes the decoded picture data in the video memory 3 in accordance with the displaying way specified by the displaying manner field 503.

In the meantime, the H/W of the displaying unit 1 has been already set to the state specified by the field 504 by the controlling unit 6.

If plural entries of the picture mode configuring information are set to be displayed, the controlling unit 6 changes the displayed picture with a next picture whenever a predetermined time elapses. For picture change, the controlling unit 6 searches the picture mode configuring information for a next flag-set entry. If found, the controlling unit 6 conducts the same operations as explained above, thus, a suitable software specified by the software identifier 501 of the next entry decodes corresponding picture data (S104-1) and presents a new picture on the displaying unit (S104) in accordance with conditions defined by the fields 503 and 504 thereof.

The above picture displaying operations for all flag-set entries are conducted continuously and circularly. If an input is entered from a user (S105) while displaying pictures like that, the controlling unit 6 releases the picture displaying mode to delete picture data in the video memory 3 (S106), to activate the PM module again (S107), and to restore resources with the backed-up data (S13). Afterwards, the controlling unit 6 conducts normal operation to process various inputs (S14).

In the above-explained embodiment, the PM module is deactivated the moment the picture displaying mode begins. However, instead of deactivating the PM module, it may be possible to set system hardware excluding picture display related hardware to be subject to power management. Information for this partial power save setting is written in the display configuration field 504 of the picture mode configuration information as aforementioned.

In general, the PM module conducts power save operations for an LCD and a backlight of the displaying unit 1, a CPU, and chipsets of peripheral devices such as the USB interface 11, etc. However, the display configuration field 504 may specify that power save operation is conducted for an CPU and chipsets of peripheral devices and not for an LCD and backlight of the displaying unit 1 and the video processor 2.

Through this partial power save, power consumption is somewhat reduced in the picture displaying mode, enabling faster battery recharge from an external power source.

The above-explained picture displaying method and apparatus of the present invention presents user's favorite picture or pictures on a displaying unit in nonuse state under the condition that an external power is supplied, whereby a user can feel sentimental emotion from a dry machine.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of displaying a picture on a personal information terminal, comprising:
   entering a power-off state of the personal information terminal by a user pressing a button or touching a display screen;
   determining that the personal information terminal is in the power-off state;
   determining whether there is any input to the personal information terminal for a predetermined time;
   determining whether an external power is supplied when it is determined that there is no input for the predetermined time;
   reading picture data from storage means and entering a picture display mode when it is determined that the external power is supplied and the personal information terminal is in the power-off state; and
   displaying the read picture data on the display screen while the personal information terminal is in the picture display mode.

2. The method of claim 1, wherein the picture data is read from the storage means with reference to location information of the picture data written in a previously-made information table.

3. The method of claim 2, wherein said information table includes information about a picture data decoder, an address of picture data, and a picture displaying manner.

4. The method of claim 3, wherein the picture data is stored in an external device other than the personal information terminal, and an address of the picture data stored in the external device is written in the address of the picture data.

5. The method of claim 3, wherein the information of the picture data decoder relates to software capable of decoding the picture data, and the address of the picture data is an address of a ROM or a RAM or is URL information used in Internet.

6. The method of claim 1, wherein displaying the read picture data includes replacing the displayed picture data with other picture data when a predetermined time elapses after the read picture data is displayed and the personal information terminal remains in the picture display mode.

7. The method of claim 1, wherein reading picture data includes stopping a power save operation of the personal information terminal, and reading the picture data with reference to location information of the picture data written in a previously-made information table.

8. The method of claim 1, wherein the personal information terminal comprises a Personal Digital Assistant (PDA).

9. The method of claim 1, wherein the input comprises the activation of the button on the personal information terminal or the touching of the display screen.

10. The method of claim 1, wherein the power-off state comprises an operation-suspended mode of the personal information terminal.

11. The method of claim 10, further comprising changing from the power-off state to a power-on state based on a user input.

12. A method of displaying a picture on a personal information terminal, comprising:
   entering a power-off state of the personal information terminal by a user pressing a button or touching a screen;
   detecting that the personal information terminal is in the power-off state;
   determining whether an external power is being supplied when the personal information terminal is determined to be in the power-off state;
   entering a picture display mode of the personal information terminal when it is determined that the external power is being supplied while in the power-off state;
   reading picture data from a storage device when the personal information terminal is in the picture display mode; and
   displaying the read picture data while the personal information terminal is in the picture display mode.

13. The method of claim 12, wherein the picture data is read from the storage device based on location information of the picture data in a previously-made information table.

14. The method of claim 13, wherein said information table includes information about a picture data decoder, an address of the picture data, and a picture displaying manner.

15. The method of claim 14, wherein the picture data is stored in an external device other than the personal information terminal, and an address of the picture data stored in the external device is written in the address of the picture data.

16. The method of claim 12, wherein displaying the read picture data includes replacing the displayed picture data with other picture data when a predetermined time elapses after the read picture data is displayed and the personal information terminal remains in the picture display mode.

17. The method of claim 12, wherein the personal information terminal comprises a Personal Digital Assistant (PDA).

18. A picture displaying apparatus embedded in a personal information terminal, comprising:
   a button;
   a display screen;
   a power supplier for receiving an electric energy from an external power source;
   a data storage for storing picture data;

a data displayer for reading and displaying the stored picture data on the display screen; and a controller for checking whether or not the external power source is supplied through said power supplier, the controller being adapted to determine that the personal information terminal has entered a power-off state by determining that user has pressed the button or touched the display screen, and the controller being adapted to control said data displayer to read the stored picture data from the data storage and to enter a picture display mode when the controller determines that the external power supply is supplied through the power supplier while the personal information terminal is in the power-off state, wherein the controller controls the display of the stored picture data by said data displayer so as to display the stored picture data when the personal information terminal is in the picture display mode.

19. The apparatus of claim 18, wherein said controller controls all elements excluding said data displayer to be in the power-off state or in the power save mode after said data displayer displays the stored picture data.

20. The apparatus of claim 18, wherein said controller controls said data displayer to replace the displayed picture data with other picture data, based on a previously-made information table, when a predetermined time elapses after the read picture data is displayed and the personal information terminal remains in the picture display mode.

21. The apparatus of claim 18, wherein said data storage is an external storage device connected to the personal information terminal through an interface, and said controller receives the picture data from the external storage device and controls said data displayer to display the received picture data.

22. The apparatus of claim 18, wherein said data storage further stores an information table including information about a picture data decoder, an address of picture data, and a picture displaying manner, and said controller controls said data displayer to display the stored picture data based on the information table.

23. The apparatus of claim 18, wherein the personal information terminal comprises a Personal Digital Assistant (PDA).

24. The apparatus of claim 18, wherein the controller determines whether there is an input to the personal information terminal for a predetermined time period and checks whether the external power source is supplied when the controller determines there is no input for the predetermined time period.

25. The apparatus of claim 24, wherein the input comprises an activation of the button on the personal information terminal or a touching of the display screen.

26. The apparatus of claim 18, wherein the power-off state comprises an operation-suspended mode of the personal information terminal.

27. The apparatus of claim 26, wherein the controller changes from the power-off state to a power-on state based on a user input.

28. A method of displaying at least one image on a personal information terminal, comprising:
(a) entering a user setting for non-use or power-save mode for the personal information terminal;
(b) determining whether there are any inputs to the personal information terminal;
(c) determining whether a prescribed period of time has passed;
(d) entering into the non-use state or power-save mode if determining the results of (b) and (c) correspond to the entered user setting;
(e) determining whether an external power is provided to the personal information terminal;
(f) entering into a picture display mode if the external power is provided to the personal information terminal after the personal information terminal has entered into the non-use or power-save mode, and reading at least one image data from a memory; and
(g) displaying the at least one image data on a display screen while the personal information terminal is in the picture display mode.

29. The method of claim 28, wherein the at least one image data is read from the memory with reference to location information of the image data written in a previously-made information table.

30. The method of claim 29, wherein said information table includes information about an image data decoder, an address of image data, and an image displaying manner.

31. The method of claim 30, wherein the image data is stored in an external device other than the personal information terminal, and an address of the image data stored in the external device is written in the address of the image data.

32. The method of claim 30, wherein the information of the image data decoder relates to software capable of decoding the image data, and the address of the image data is an address of a ROM or a RAM or is URL information used in Internet.

33. The method of claim 28, wherein displaying the at least one image data includes replacing the displayed image data with other image data when a predetermined time elapses after the at least one image data is displayed and the personal information terminal remains in the picture display mode.

* * * * *